(12) United States Patent
Welborn

(10) Patent No.: US 7,680,090 B2
(45) Date of Patent: Mar. 16, 2010

(54) SYSTEM AND METHOD FOR MONITORING NETWORK TRAFFIC

(75) Inventor: Matthew L. Welborn, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 403 days.

(21) Appl. No.: 11/711,705

(22) Filed: Feb. 28, 2007

(65) Prior Publication Data

US 2008/0205274 A1   Aug. 28, 2008

(51) Int. Cl.
*H04Q 7/24* (2006.01)
*H04L 12/413* (2006.01)

(52) U.S. Cl. .................................... 370/338; 370/445

(58) Field of Classification Search ............... 370/338, 370/445
See application file for complete search history.

(56) References Cited

U.S. PATENT DOCUMENTS

| | | | |
|---|---|---|---|
| 2003/0101276 A1* | 5/2003 | Park et al. ................ | 709/238 |
| 2003/0112810 A1* | 6/2003 | Nakabayashi et al. ...... | 370/401 |
| 2004/0132415 A1* | 7/2004 | Furukawa ................. | 455/78 |
| 2004/0240441 A1* | 12/2004 | Sriram .................... | 370/389 |
| 2005/0245298 A1* | 11/2005 | Mori ..................... | 455/575.7 |
| 2006/0245424 A1* | 11/2006 | Ramanathan et al. ....... | 370/389 |
| 2006/0245428 A1* | 11/2006 | Yanamoto et al. ......... | 370/394 |
| 2007/0110102 A1* | 5/2007 | Yagyuu et al. ............ | 370/470 |
| 2008/0002599 A1* | 1/2008 | Yau et al. ................ | 370/310 |
| 2008/0101396 A1* | 5/2008 | Miyata ................... | 370/408 |

* cited by examiner

*Primary Examiner*—Andrew Lee

(57) ABSTRACT

A transceiver (110, 120, 130, 140) is provided, comprising: a receiver circuit (230) configured to process an incoming signal received over a transmission channel; a transmitter circuit (240) configured to generate an outgoing signal; a preamble detector (260) configured to monitor the transmission channel to determine whether a preamble or header is currently being transmitted over the transmission channel; and a control circuit (250) configured to enable the transmitter circuit to generate the outgoing signal whenever the preamble detector determines that no preamble or header is currently being received. The transceiver may also include a memory (270) for storing packet details regarding a status of other packets being sent over the transmission channel,

19 Claims, 3 Drawing Sheets

SYSTEM AND METHOD FOR MONITORING NETWORK TRAFFIC

FIELD OF THE INVENTION

The present invention relates in general to a system and method for monitoring network traffic in a network and identifying when it is permissible to transmit signals.

BACKGROUND OF THE INVENTION

In any network in which devices share a single transmission channel (e.g., a wireless network, a shared bus network, etc.), every device can hear all or most of the other devices. In such a network when two devices transmit a signal at the same time, the two transmitted signals are considered to have collided. It's typically desirable to avoid such collisions, since it often will result in both signals being unintelligible to their target devices, causing no data to be sent and thus losing use of the transmission medium (i.e., the transmission channel) for a time. Both signals will then have to be resent, lowering the data throughput of the network. If this happens often enough, the entire transmission medium could be rendered ineffective.

As a result, in order to reduce the number of collisions and maximize data throughput, it is generally desirable to provide some kind of protocol to minimize the chance that two devices will transmit a signal at the same time. Several different protocols are available.

A frequency division multiple access (FDMA) divides the transmission medium up into discrete frequency ranges and assigns each device or network to a given range. A device or network can only transmit in its assigned frequency range, but knows that it won't have a collision with another device or network. Broadcast radio and television use an FDMA protocol. In may cases, this protocol is layered on top of another protocol, with FDMA assigning a frequency range to a network, and some other protocol coordinating network transmissions within the assigned frequency range.

A time division multiple access (TDMA) protocol divides the available transmission time up into discrete time slots and assigns them to individual devices or device pairs. Each device can only transmit in its allotted time, but knows that it won't have a collision with another device.

A code division multiple access (CDMA) protocol allows individual devices to transmit at the same time, but has each device use its own assigned code to encode transmissions. Collision will still occur, but if orthogonal or mostly orthogonal codes are chosen, the effect of such collisions can be minimized.

An ALOHA protocol allows devices to transmit without sensing the channel at all. This results in comparatively higher collision rates and reduced efficiency as more transmissions must be resent. A slotted ALOHA protocol further refines the idea by dividing the available transmission time up into discrete time slots. It uses an ALOHA protocol within those time slots, but only allows each device to start a transmission at the beginning of one of the time slots. Thus, if no collision occurs immediately, it won't happen at all.

A carrier sense multiple access (CSMA) protocol has a potential transmitting device listen to the transmission channel prior to transmitting, and only allows it to transmit if it hears no one else transmitting (i.e., only if the transmission channel is clear). However, this still runs into the danger that two devices will both hear that the transmission channel is clear and start to transmit at the same time, thus causing a collision.

One way to improve CSMA performance is to use collision avoidance (CA). Under a CSMA/CA protocol, each device must first inform all other devices of its intent to transmit. Only once this is done can a device make a data transmission.

Another way to improve CSMA performance is to use collision detection (CD). Under a CSMA/CD protocol, each device monitors the transmission channel prior to transmitting and only starts transmitting if the medium is free, just as with basic CSMA. But the device also continues to monitor for other signals throughout transmission. If it detects another signal and a collision occurs, it stops transmitting and backs off for a time, trying to transmit the data again later. The Ethernet protocol is an example of a CSMA/CD protocol.

However, some low-power, high bandwidth networks (e.g., ultrawide bandwidth networks) may have sufficiently high processing gain (e.g., 10 dB) that a device can successfully send a data transmission even if it overlaps with another transmission. In such a network it may therefore be possible for a device to transmit data even when another transmission is in process. But if the device is in a conventional CSMA protocol (with or without CD), it may nevertheless be forced to avoid transmission while the other device is transmitting. This will unnecessarily limit transmission opportunities and greatly reduce network throughput.

It is therefore desirable to provide a system and method through which a CSMA protocol can be altered to allow for the transmission of multiple simultaneous signals, while still minimizing the chance of fatal collisions.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Wireless Networks

Figure 1:
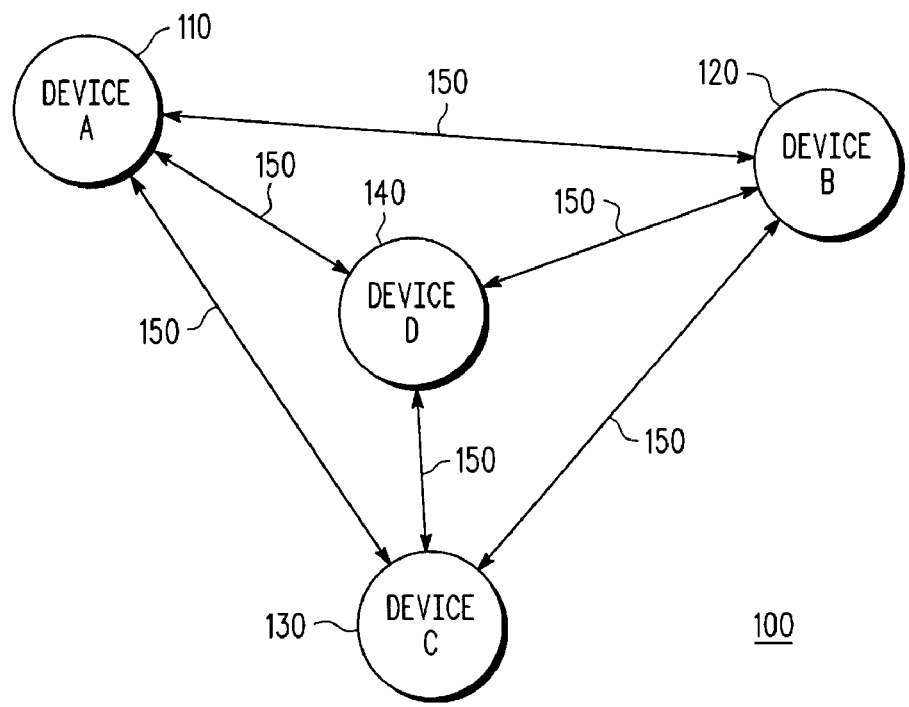
FIG. 1 is a block diagram of a wireless network according to disclosed embodiments of the present invention.

FIG. 1 is a block diagram of a wireless network according to disclosed embodiments of the present invention. As shown in FIG. 1, this wireless network 100 includes four devices: device A 110, device B 120, device C 130, and device D 140. Each device 110, 120, 130, and 140 can communicate with at least one other device 110, 120, 130, or 140 in the network via a communication link 150.

The devices 110, 120, 130, and 140 can be any sort of wireless transceiver device. In particular disclosed embodiments the devices 110, 120, 130, and 140 are low power, wide or ultrawide bandwidth devices capable of using a packet-based CSMA protocol. Exemplary protocols that use CSMA include ZigBee, IEEE 802.11, and IEEE 802.15. Other protocols are also within the scope of the current invention, however.

The communications links 150 represent paths in a single transmission channel (i.e., the air, a shared bus, etc.) through which signals can pass. In some embodiments there can be a communications link 150 between every device and every other device, representing the fact that every device has full use of the transmission channel. In other embodiments there may be some devices that can't communicate with others, and so don't have a communications link 150 between them. This can occur for a variety of reasons such as distance between devices in a wireless link, obstacles between devices in a wireless link, interference, etc.

When each device transmits over the transmission channel, it actually transmits over all of the communications links 150 that it is connected to (i.e., to all of the devices that can hear it). For example, in the network of FIG. 1, if device A 110 sends a data packet to device C 130, the packet will would pass through the communications link 150 between device A 110 and device C 130, the communications link 150 between device A 110 and device B 120, and the communications link 150 between device A 110 and device D 140. Thus, even though the packet is meant for device C 130, it could be heard by device B 120 and device D 140 as well.

Similarly, when a device listens to the transmission channel, it listens to all of the communications links 150 that it's connected to. For example, in the network of FIG. 1, if device B 120 is listening to a packet sent to it over the communications link 150 with device D 140, it will actually be listening to the communications link 150 between device A 110 and device B 120, the communications link 150 between device C 110 and device B 120, and the communications link 150 between device D 140 and device B 120. Thus, even though the packet is coming from device D 120, device B must listen to any transmissions from device A 110 and device C 130 as well.

As a result of this, absent some transmission protocol, there is a possibility that packets will collide. This can happen if two devices 110, 120, 130, or 140 both transmit a packet at the same time.

As noted above, one protocol that can be used to avoid packet collisions is a carrier sense multiple access (CSMA) protocol in which each device must make certain that the transmission channel (i.e., all communications links 150 it can hear) is clear. However, in this embodiment, the devices have sufficiently high processing gain (e.g., 10 dB) that a device can successfully send a data transmission even if it overlaps with another transmission. When the network properties are such that overlapping packet transmissions are possible without undue interference, the network provides a mechanism by which such overlapping packet transmissions can be made with minimal chance of fatal collisions.

Fatal collisions can occur when a device tries to send a packet to a device that is also receiving a packet from another device, or when a device tries to send a packet when it is also receiving a packet from another device. This is because while overlapping transmissions are possible without the signals themselves fatally interfering with each other, each receiver can typically only successfully receive one transmission at a time. Thus, overlapping transmissions can only be successfully sent when they are between different device pairs.

As a result, in this network, each device monitors the transmission channel for any packet that's being sent. Once a device recognizes a packet, it listens long enough to determine who the packet is addressed to. Typically this involves listening to a preamble and header in a packet. If the packet is not addressed to either the monitoring device or a device it wishes to send data to, then the monitoring device can send its data.

Although FIG. 1 discloses a network having four devices that can all hear one another, alternate embodiments can have more or fewer devices, and may have some devices without communications links between them.

Wireless Transceiver

Figure 2:
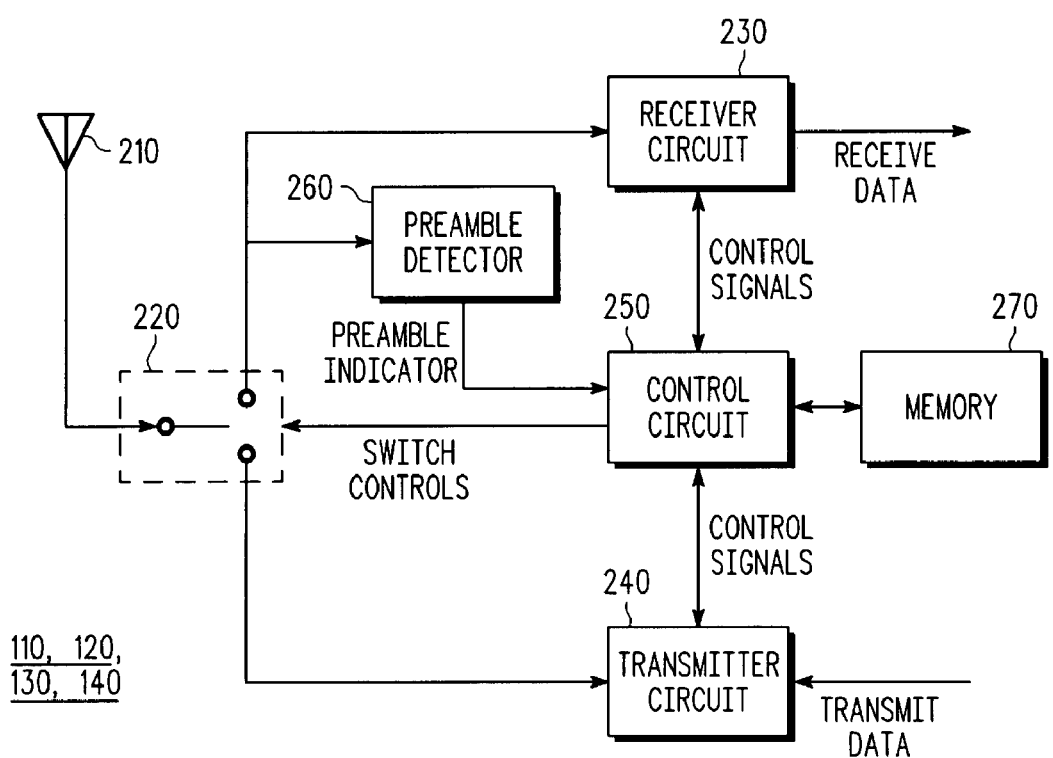
FIG. 2 is a block diagram of a transceiver according to disclosed embodiments of the present invention.

FIG. 2 is a block diagram of a transceiver according to disclosed embodiments of the present invention. This transceiver can correspond to the devices 110, 120, 130, and 140 of FIG. 1. As shown in FIG. 2, the transceiver 110, 120, 130, 140 includes an antenna 210, a transmit/receive (T/R) switch 220, a receiver circuit 230, a transmitter circuit 240, a control circuit 250, a preamble detector 260, and a memory 270. Although FIG. 2 shows a wireless transceiver 110, 120, 130, 140, this is by way of example only. In alternate embodiments the transceiver 110, 120, 130, 140 could be a wired device.

The antenna 210 serves to receive and transmit signals over a wireless transmission channel. In an alternate wired embodiment, the antenna could either be eliminated or replaced with an appropriate interface with a wired transmission channel.

The T/R switch 220 serves to connect the antenna 210 with the receiver circuit 230 during a receive operation and the transmit circuit 240 during a transmit operation, based on switch controls from the control circuit 250. The T/R switch may be eliminated in some alternate embodiments, however. Alternate mechanisms may be employed to isolate the receiver circuit 230 and the transmitter circuit 240, if necessary. For example, some kind of high/low impedance circuit can be provided at the input of the receiver circuit 230 and the output of the transmitter circuit 240.

The receiver circuit 230 performs the necessary functions for successfully receiving an incoming signal and properly extracting receive data from any data packets in the incoming signal. The details of such a receiver circuit 230 would be well known to one skilled in the art.

The transmitter circuit 240 performs the necessary functions for successfully encoding transmit data into an outgoing data packet and providing the packet to the antenna for transmission. The details of such a transmitter circuit 240 would be well known to one skilled in the art.

The control circuit 250 provides all control signals and switch controls necessary to control operations of the T/R switch 220, the receiver circuit 230, and the transmitter circuit 240. It receives additional control signals from the receiver circuit 230 and the transmitter circuit 240, as well as preamble indicator signals from the preamble detector. The control circuit 250 also stores packet details in the memory 270 to allow it to monitor the status of the transmission channel.

The preamble detector 260 is connected between the T/R switch 220 and the control circuit 250 and receives the same signals as the receive circuit 230. The preamble detector 260 monitors any incoming signals and looks for preamble and header data. The preamble data helps identify a signal as a packet; and the header data provides necessary information for deciphering the data packet, including a source address and a destination address for the packet.

When the preamble detector 260 receives and successfully deciphers the preamble and header of an incoming packet, it provides the control circuit 250 with preamble indicator signals that include an identification that there is a valid incoming packet, as well as certain packet details that may include the destination address for the packet and the duration of the packet (if variable). But these indicator signals need not be sent at the same time. For example, the preamble detector 260 might send an indicator signal telling the control circuit 250 that a valid packet is being sent as soon as the packets preamble is successfully received. Then it might send additional indicator signals at a later point once the packet's header has been deciphered and relevant destination or duration information has been extracted.

The memory 270 is used by the control circuit 250 to store relevant packet details received in the preamble indicator signals (e.g., who is currently sending or receiving a packet, and for how long). In alternate embodiments the memory 270 could be eliminated, though this may increase the possibility of collisions.

In operation, the control circuit 250 can use the current preamble indicator signals and the packet details from previous preamble indicator signals (retrieved from the memory 270) to determine when the transceiver 110, 120, 130, 140 is allowed to transmit a packet.

The fact that element 260 is called a preamble detector and its output signals are called preamble indicator signals should not be interpreted as limiting its operation to detecting only the receipt of the preamble and reporting the same. As noted, it is also capable of deciphering and reporting information from the header as well.

In general, a transceiver is provided, comprising: a receiver circuit configured to process an incoming signal received over a transmission channel; a transmitter circuit configured to generate an outgoing signal; a preamble detector configured to monitor the transmission channel to determine whether a preamble or header is currently being transmitted over the transmission channel; and a control circuit configured to enable the transmitter circuit to generate the outgoing signal whenever the preamble detector determines that no preamble or header is currently being received.

The transceiver may further comprise a memory for storing packet details regarding a status of other packets being sent over the transmission channel, wherein the control circuit is further configured to enable the transmitter circuit to generate the outgoing signal whenever the preamble detector determines that no preamble or header is currently being received, and that a target device is not currently sending or receiving a data signal.

The transceiver may further comprise an antenna configured to receive the incoming signal from the transmission channel, to provide the incoming signal to the receiver circuit, to receive the outgoing signal generated by the transmitter circuit, and to transmit the outgoing signal over the transmission channel. The transceiver may further comprise a switching element configured to connect one of the receiver circuit and the transmitter circuit to the antenna based on a switch control signal from the control circuit.

The receiver circuit may be further configured to decode the preamble and the header when the preamble and the header are detected by the preamble detector, to determine a target device for a payload associated with the header, and to identify the target device to the control circuit.

The preamble and the header may both use a first spreading code different from a second spreading code used by the payload associated with the header. The incoming signal and the outgoing signal use a waveform with a processing gain of about 10 dB or greater.

The transmission channel may be a wireless medium. The incoming signal and the outgoing signal may both be ultrawide bandwidth signals. The transceiver may be implemented in an integrated circuit.

Signal Traffic

Figure 3:
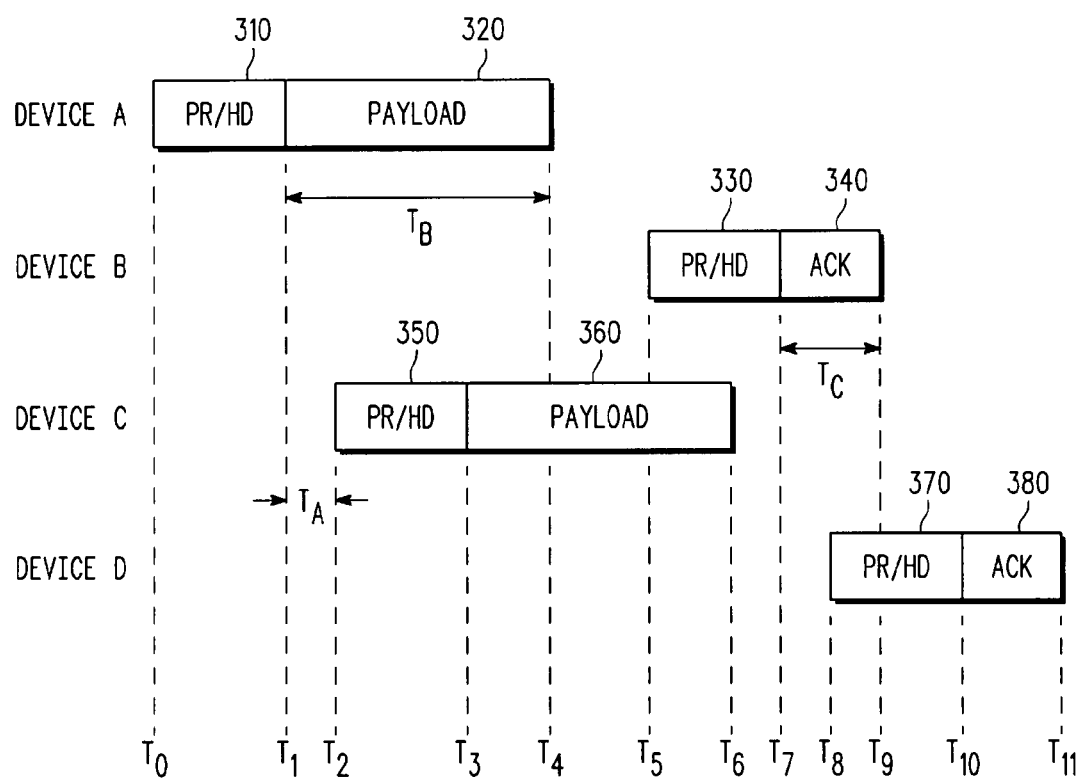
FIG. 3 is a diagram of a series of wireless transmissions within the network of FIG. 1, according to disclosed embodiments of the present invention.

FIG. 3 is a diagram of a series of wireless transmissions within the network of FIG. 1, according to disclosed embodiments of the present invention. As shown in FIG. 3, in this example, device A 110 wishes to send a data packet to device B 120, and device C 130 wishes to send a data packet to device D 140.

Device A 110 starts by sending a data packet 305 to device B 120 at time $T_0$. This data packet 305 includes a preamble/header 310 and a data payload 320. Prior to sending the data packet 105, device A 110 would have monitored the transmission channel (i.e., the transmission medium) and determined that there were no other signals being sent.

The preamble/header 310 is transmitted from time $T_0$ to time $T_1$. During this time period no other signals may be transmitted, since every other device should be listening to the preamble/header 310.

Immediately after the preamble/header 310, device A 110 sends the data payload 320 from time $T_1$ to $T_4$. During this time period other signals may be transmitted, so long as they are not directed to device A 110 or device B 120, which are already occupied with a transmission.

During the time between $T_0$ and $T_1$ device C 130 obtains data that it needs to send to device D 140. Because it is currently receiving the preamble/header 310, it must wait until after $T_1$ to send it, i.e., once it has finished listening to the preamble/header 310. In a real system, however, device C 130 will actually have to wait an additional delay time $T_A$ after $T_1$ until time $T_2$ before it can transmit the data packet 245. $T_A$ corresponds to the propagation delay of the preamble detector 260 providing the preamble indicator signals to the control circuit 250, the control circuit 250 instructing the transmitter circuit 240 to transmit, and the transmitter circuit 240 actually transmitting a data packet 345.

Thus, device C 130 can start transmitting its data packet 345 as early as $T_2$, and while device A 110 is still transmitting its packet (i.e., during a payload transmission time $T_B$). In fact, although in this embodiment device C 130 starts transmitting the data packet 345 at $T_2$, it can transmit its packet at any time between $T_2$ and the next time it receives a preamble/header (time $T_5$, in this example).

The data packet 345 includes a preamble/header 350 and a data payload 360. The preamble/header 350 is transmitted from time $T_2$ to time $T_3$, and the data payload 360 is transmitted from time $T_3$ to time $T_6$.

During the time period between $T_2$ to time $T_3$, no other signals may be transmitted in the network, since every other device should be listening to the preamble/header 350. An exception to this is any occupied device that is currently sending or receiving a packet, since they are already occupied with a transmission. But this won't cause any missed data. Because although these occupied devices won't be listening to the incoming preamble/header, they won't be its target device, since the transmitting device knows not to send anything to them.

In the current example, when device C 130 finishes hearing the preamble/header 310, it knows from the header information it extracted that device A 110 and device B 120 are busy with a transmission until $T_4$. Therefore, it knows not to send anything to either of these devices until at least $T_4$ (or perhaps some slight delay after $T_4$ to allow the devices to switch their receivers on again). But in this case device C 130 has data for device D 140, so it can safely send that. If device C 130 had data to send to device A 110 or device B 120, however, it would have to wait until after $T_4$ to send it.

Similarly, if device B 120 received data to send sometime between $T_0$ and $T_4$, it would also not be able to send it until after $T_4$. This is because it will be receiving the data packet 305 until $T_4$.

Furthermore, since this embodiment requires packet acknowledgement, device B 120 must send an acknowledgement packet 325 to device A 110 after receiving the data packet 305. This acknowledgement packet 325 includes a preamble/header 330 and an acknowledgement payload 340. Likewise, device D 120 must send an acknowledgement packet 365 to device C 130 after receiving the data packet 345. This acknowledgement packet 365 includes a preamble/header 370 and an acknowledgement payload 380. These acknowledgement packets 325 and 365 follow the same rules as the data packets 305 and 345. Alternate embodiments that do not require packet acknowledgement can eliminate such acknowledgement packets.

For example, once device B 120 finishes receiving the data packet 305 at $T_4$, it must monitor the transmission channel and can only send the acknowledgment packet 325 if the channel is clear of other preamble/headers. In the current embodiment, although the data payload 360 is still being sent until $T_6$, there is no preamble/header being sent. Therefore, device B 120 is able to send the acknowledgment packet 325 at time $T_5$. The preamble/header 330 is transmitted from time $T_5$ to time $T_7$, and the acknowledgment payload 340 is transmitted from time $T_7$ to time $T_9$. Although device B 120 was free to send its acknowledgement packet 325 as soon as the data packet 305 was finished at $T_4$ (since there was no conflicting preamble/header), it typically takes some time for the acknowledgment packet 325 to be generated, and so device B 120 will wait until $T_5$.

Likewise, once device D 140 finishes receiving the data packet 345 at $T_6$, it must monitor the transmission channel and can only send a packet if it's clear of other preamble/headers. In this case, when the data payload 360 finishes, there is still a portion of the preamble/header 330 being sent. However, since device D 140 will only be able to monitor the preamble/header 330 from the middle, it may miss the preamble portion and be unable to recognize it as a preamble/header 330. But this won't be a problem. Because the preamble/header 330 was started when the data payload 360 was still being transmitted, it won't be targeted to either device C 130 or device D 140. So device D 140 can safely send the acknowledgment packet 365 any time after time $T_6$.

In this case, the preamble/header 370 is transmitted from time $T_9$ to time $T_{10}$, and the data payload 380 is transmitted from time $T_{10}$ to time $T_{11}$. Although device D 140 was free to send its acknowledgement packet 365 as soon as the data packet 345 was finished at $T_6$ (since it could detect no conflicting preamble/header), it typically takes some time for the acknowledgment packet 365 to be generated. Nevertheless, device D 140 can still start sending its acknowledgement packet 365 during the payload transmission time $T_C$, when the acknowledgement payload 340 is still being transmitted.

This operation can then proceed forward with more data being sent between the various devices, and can be applied to networks with different numbers of devices. Each device need only monitor the transmission channel when not transmitting or receiving a packet, and keep track of who is using the transmission channel, and for how long.

In alternate embodiments it is also possible for devices to enter into a sleep mode during payload transmission times if they have no data of their own to send. This may lead to increased collisions, since some payload/headers may be missed during the sleep time. However, in some cases such a cost may be outweighed by the benefits of saved power.

Of course, it's still possible that collisions will occur in this system. Given propagation delays, it's always possible that a genuinely conflicting signal will be sent between the time when a device determines that the transmission channel is clear and when it can actually start transmitting. In this case the system can use standard CSMA collision recovery procedures to determine when and how to recover.

In this embodiment, the preamble/headers 310, 330, 350, and 370 each include a known preamble signal pattern used to identify a data packet and allow its signal to be acquired, and a header that provides necessary data for deciphering the data packet, including a source address and a destination address for the packet. The data payloads 320 and 360 include data meant for transmission. And the acknowledgement payloads 340, 380 include any data required to acknowledge a data packet 305 or 345. In some embodiments the acknowledgement payloads 340, 380 can be eliminated and all acknowledgement data sent via the preamble/headers 330 and 370.

Because all or most devices will wish to hear a preamble/header portion of any packet, and its transmission may occur during a time period when a packet payload is being transmitted to another device, the spreading codes for the header/payload portions and the payload portions of packets can be made different. By choosing appropriate spreading codes to minimize interference (e.g., orthogonal or mostly orthogonal codes), the system can thus minimize the effect of any collisions between payloads and header/payload portions (e.g., between times $T_2$ and $T_3$ in the embodiment of FIG. 3). As a result, it will be easier for each device to receive a header/payload portion without error.

Method of Monitoring Signal Traffic

Figure 4:
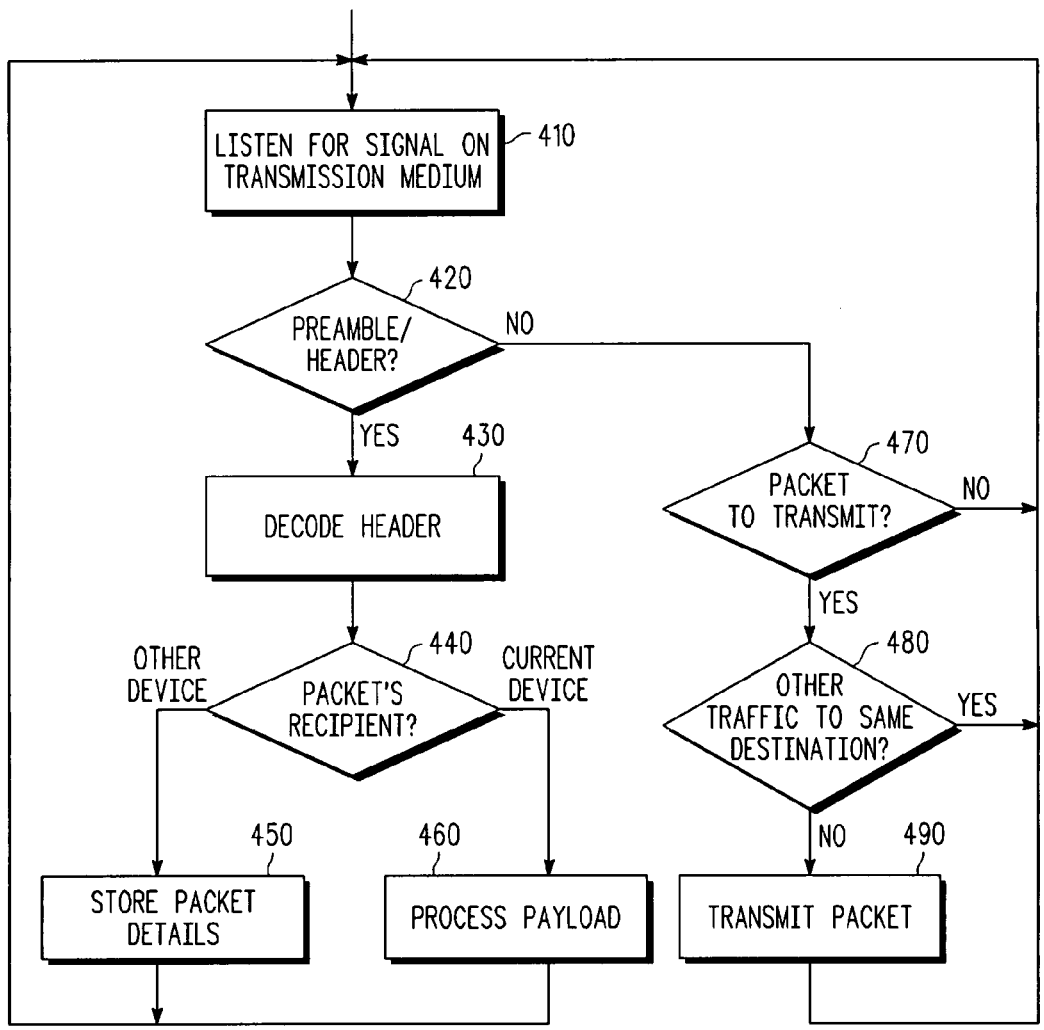
FIG. 4 is a flow chart of a method of monitoring network traffic according to disclosed embodiments of the present invention.

FIG. 4 is a flow chart of a method of monitoring network traffic according to disclosed embodiments of the present invention. As shown in FIG. 4, the operation begins when a current device listens for a signal on a transmission medium (i.e., a transmission channel). (410)

While listening, the current device determines whether it is receiving a preamble/header. (420) If it is receiving a preamble/header, the device decodes the preamble/header (430) and determines the packet's intended recipient. (440)

If the recipient is another device, the current device can store important details about the incoming packet (e.g., source, recipient, and duration) (450) and return to listening to the transmission medium. (410)

If, however, the recipient is the current device, then the current device proceeds to process the packet's payload (460) before returning to listening to the transmission medium. (410)

If while listening for a signal (410), the current device hears no preamble/header (420), then it determines if it has a packet to transmit. (470)

If the current device has no packets to transmit, it simply returns to listening to the transmission medium. (410) If, however, the current device has one or more packets to transmit, it looks at any stored packet details to determine if any other traffic is currently being sent to or from the same destination. (480)

If there is data being currently sent to or from the same destination, the current device returns to listening to the transmission medium (410) and waits for a better time to send the data. If, however, no data is being currently sent to or from the same destination, the current device transmits the packet of data to the target device (490) and returns to listening to the transmission medium. (410)

In alternate embodiment the storing (450) and the determination of other traffic (480) could be eliminated, though this might increase the likelihood of collisions.

In general, a method is provided of operating a local transceiver, comprising: receiving at least a preamble and a header portion of an incoming packet over a transmission medium, the incoming packet comprising the preamble, the header portion, and a payload; decoding the preamble and header; and transmitting an outgoing packet over the transmission medium to a target transceiver after the preamble and header are received and decoded, but before the payload is finished being transmitted over the transmission medium, wherein the incoming packet is addressed to a device other than the local transceiver or the target transceiver.

The preamble and the header may both use a first spreading code different from a second spreading code used by the payload.

The operation of decoding the preamble and header may comprise: identifying a destination transceiver for the payload based on the header; determining whether the destination transceiver corresponds to the local transceiver; and determining whether the destination transceiver corresponds to the target transceiver.

The incoming packet may be sent using an ultrawide bandwidth transmission. The method may be implemented in an integrated circuit.

A method of operating a local transceiver is also provided, comprising: receiving at least a preamble and a header portion of an incoming packet over a transmission medium, the incoming packet comprising the preamble, the header portion, and a payload; decoding the preamble and header; determining whether an incoming destination address for the payload corresponds to one of a local address for the local transceiver or an outgoing address for a remote transceiver that is an intended destination for an outgoing packet; repeating the receiving, decoding, and determining operations after the preamble and header are received and decoded, but before the payload is finished being transmitted, wherein the incoming packet is addressed to the remote transceiver.

The preamble and the header may both use a first spreading code different from a second spreading code used by the payload.

The operation of decoding the preamble and header may comprise: identifying a destination transceiver for the payload based on the header; determining whether the destination transceiver corresponds to the local transceiver; and determining whether the destination transceiver corresponds to the target transceiver.

The incoming packet may be sent using an ultrawide bandwidth transmission. The method may be implemented in an integrated circuit.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A transceiver, comprising:
    a receiver circuit configured to process an incoming signal received over a transmission channel;
    a transmitter circuit configured to generate an outgoing signal;
    a preamble detector configured to monitor the transmission channel to determine whether a preamble or header is currently being transmitted over the transmission channel; and
    a control circuit configured to enable the transmitter circuit to generate the outgoing signal whenever the preamble detector determines that no preamble or header is currently being received,
    wherein the preamble and the header both use a first spreading code different from a second spreading code used by the payload associated with the header.

2. The transceiver of claim 1,
    further comprising a memory for storing packet details regarding a status of other packets being sent over the transmission channel,
    wherein the control circuit is further configured to enable the transmitter circuit to generate the outgoing signal whenever the preamble detector determines that no preamble or header is currently being received, and that a target device is not currently sending or receiving a data signal.

3. The transceiver of claim 1, further comprising an antenna configured to receive the incoming signal from the transmission channel, to provide the incoming signal to the receiver circuit, to receive the outgoing signal generated by the transmitter circuit, and to transmit the outgoing signal over the transmission channel.

4. The transceiver of claim 3, further comprising a switching element configured to connect one of the receiver circuit and the transmitter circuit to the antenna based on a switch control signal from the control circuit.

5. The transceiver of claim 1, wherein the receiver circuit is further configured to decode the preamble and the header when the preamble and the header are detected by the preamble detector, to determine a target device for a payload associated with the header, and to identify the target device to the control circuit.

6. The transceiver of claim 1, wherein the incoming signal and the outgoing signal use a waveform with a processing gain of about 10 dB or greater.

7. The transceiver of claim 1, wherein the transmission channel is a wireless channel.

8. The transceiver of claim 1, wherein the incoming signal and the outgoing signal are both ultrawide bandwidth signals.

9. The transceiver of claim 1, wherein the transceiver is implemented in an integrated circuit.

10. A method of operating a local transceiver, comprising:
    receiving at least a preamble and a header portion of an incoming packet over a transmission medium, the incoming packet comprising the preamble, the header portion, and a payload;
    decoding the preamble and header; and
    transmitting an outgoing packet over the transmission medium to a target transceiver after the preamble and header are received and decoded, but before the payload is finished being transmitted over the transmission medium,
    wherein the incoming packet is addressed to a device other than the local transceiver or the target transceiver.

11. The method of claim 10, wherein the preamble and the header both use a first spreading code different from a second spreading code used by the payload.

12. The method of claim 10, wherein the operation of decoding the preamble and header comprises:
    identifying a destination transceiver for the payload based on the header;
    determining whether the destination transceiver corresponds to the local transceiver; and
    determining whether the destination transceiver corresponds to the target transceiver.

13. The method of claim 10, wherein the method incoming packet is sent using an ultrawide bandwidth transmission.

14. The method of claim 10, wherein the method is implemented in an integrated circuit.

15. A method of operating a local transceiver, comprising:
    receiving at least a preamble and a header portion of an incoming packet over a transmission medium, the incoming packet comprising the preamble, the header portion, and a payload;
    decoding the preamble and header;
    determining whether an incoming destination address for the payload corresponds to one of a local address for the local transceiver or an outgoing address for a remote transceiver that is an intended destination for an outgoing packet;
    repeating the receiving, decoding, and determining operations after the preamble and header are received and decoded, but before the payload is finished being transmitted,
    wherein the incoming packet is addressed to the remote transceiver.

16. The method of claim 15, wherein the preamble and the header both use a first spreading code different from a second spreading code used by the payload.

17. The method of claim 15, wherein the operation of decoding the preamble and header comprises:
    identifying a destination transceiver for the payload based on the header;
    determining whether the destination transceiver corresponds to the local transceiver; and
    determining whether the destination transceiver corresponds to the target transceiver.

18. The method of claim 15, wherein the method incoming packet is sent using an ultrawide bandwidth transmission.

19. The method of claim 15, wherein the method is implemented in an integrated circuit.

* * * * *